United States Patent [19]

Shibata

[11] Patent Number: 4,703,381
[45] Date of Patent: Oct. 27, 1987

[54] MAGNETIC HEAD WITH A FILM COIL

[75] Inventor: Norio Shibata, Sagamihara, Japan

[73] Assignee: Victor Company of Japan, Limited, Yokohama, Japan

[21] Appl. No.: 854,723

[22] Filed: Apr. 16, 1986

Related U.S. Application Data

[63] Continuation of Ser. No. 462,245, Jan. 31, 1983, abandoned.

[30] Foreign Application Priority Data

Feb. 9, 1982 [JP] Japan ................................. 57-18237

[51] Int. Cl.$^4$ .............................................. G11B 5/17
[52] U.S. Cl. ..................................... 360/123; 360/121
[58] Field of Search .................................. 360/121, 123

[56] References Cited

U.S. PATENT DOCUMENTS

| | | | |
|---|---|---|---|
| 3,543,396 | 12/1970 | Illg .................................. | 360/127 X |
| 3,601,871 | 8/1971 | Pierce ............................ | 360/123 X |
| 3,634,632 | 1/1972 | Watson .......................... | 360/123 X |
| 4,223,360 | 9/1980 | Sansom .......................... | 360/123 |
| 4,310,821 | 1/1982 | Frances .......................... | 360/123 X |

FOREIGN PATENT DOCUMENTS 2950943 7/1980 Fed. Rep. of Germany .

OTHER PUBLICATIONS

IBM TDB; vol. 12, No. 6, Nov. 1969; J. Moreno; "Printed Circuit Coil"; p. 778.
IBM Technical Disclosure Bulletin, vol. 15, 1972, No. 2, p. 363.

Primary Examiner—A. J. Heinz
Attorney, Agent, or Firm—Pollock, VandeSande & Priddy

[57] ABSTRACT

A magnetic head comprises a core assembly including a generally U-shaped first core half and a second core half, and a coil assembly made of a film coil. The coil assembly has a through-hole at its center, and is arranged such that a rear portion of the U-shaped first core half penetrates the through-hole. In one embodiment, the coil assembly is bent so that it is U-shaped when viewed from the front of the head. In another embodiment, the coil assembly is bent so that it is crank-shaped when viewed from the front. In a further embodiment, the coil assembly is substantially flat, but is inclined so that the plane of the coil assembly is not perpendicular to the plane including the core assembly. The present invention may be applied to a multi-track head which has a small space between adjacent heads because the head arrangement according to the present invention provides a narrow head with a sufficient number of coil turns.

17 Claims, 14 Drawing Figures

MAGNETIC HEAD WITH A FILM COIL

This is a continuation of co-pending application Ser. No. 462,245, filed on Jan. 31, 1983, now abandoned.

BACKGROUND OF THE INVENTION

This application is related to co-pending U.S. application Ser. No. 456,324, titled "MULTI-TRACK MAGNETIC HEAD AND METHOD OF FABRICATING THE SAME", filed on Jan. 6, 1983 by the present inventor.

This invention relates generally to magnetic head for use with magnetic recording/reproducing devices, such as tape recorders, and more particularly, the present invention relates to magnetic heads having a coil made on a film substrate.

Conventional magnetic heads comprise a coil made of a copper wire, which is wound around a core via an insulator. In such conventional magnetic heads having a wound coil, since an insulating film is first wound around the core, the space left for the coil is limited, resulting in a small number of coil turns. Furthermore, since reduction in thickness of a copper wire has a limit, the number of turns of the coil is also limited. For these reasons, it has been diffcult to provide small magnetic heads. Especially, in the case of reproduce heads, a large number of coil turns is required to show an adequate signal output amplitude. Moreover, when handling a high-frequency signal, such as a digital signal, the output signal amplitude is apt to be low due to short wavelength on a recording medium. In the case of a multi-track head, the space between adjcent cores is limited, and thus a large number of coil turns cannot be expected.

In order to remove the above-described drawbacks inherent to the conventional wound-coil type heads, it is theoretically possible to employ a printed coil formed on a substrate as a coil pattern. Such a printed coil is known as U.S. Pat. No. 4,264,789 titled "VOICE COIL ASSEMBLY FOR A SPEAKER". However, such a printed coil has not been used hitherto for magnetic heads for the following reasons. Although it is possible to increase the number of coil turns when a printed circuit forming technique is used to fabricate a spiral coil pattern, such a printed coil having a large number of turns is apt to have a large diameter or width, which causes the entire width of a magnetic head to be increased when incorporated therein. Furthermore, it has been difficult to incorporate such a plate-like or film-like printed coil with the core of a magnetic head. Due to these difficulties, magnetic heads used in magnetic recording/reproducing devices employ a conventional wound coil, and therefore the conventional heads suffer from the above-mentioned drawbacks.

SUMMARY OF THE INVENTION

The present invention has been developed in order to remove the above-described drawbacks inherent to the conventional magnetic heads.

It is, therefore, an object of the present invention to provide a magnetic head with a coil having a large number of turns, while the width of the head measured in a direction parallel to the longitudinal axis of the head gap is relatively small.

According to a feature of the present invention, a coil formed in a film is incorporated with a portion of a magnetic core having core halves, in such a manner that a magnetic path of the core passes through a through-hole made at the center of the film coil, the film coil being bent to take a U-shape or crank shape, or a flat film coil being inclined from a plane including the head gap so that the width of the head is reduced.

According to a another feature of the present invention, a large amount of recording signal current can be applied to the coil of the head when the head is used as a record head inasmuch as the cross-sectional area of the conductor constituting the coil can be made large enough.

According to a further feature of the present invention, an output signal having a large amplitude can be derived from the coil of the head when the head is used as a reproduce head because the impedance of the coil is maintained low.

In accordance with the present invention there is provided a magnetic head comprising: a core assembly having first and second core halves facing each other and forming a head gap therebetween, the first core half having a recess at one side, where the first core half faces the second core half, so as to form a substantially U-shaped core half having front and rear ribs and a web interposed between the front and rear ribs, the first and second core halves forming a closed magnetic path along a plane including the first and second core halves; and a film coil having a film base and a coil pattern printed on the film base, the film coil having a through-hole at its center, and being incorporated with the core assembly so that a portion of the closed magnetic path passes through the through-hole of the film coil, the film coil being arranged such that a plane of a portion thereof makes an angle other than 90 degrees with respect to the plane including the core halves.

In accordance with the present invention there is also provided a multi-track head having a plurality of magnetic heads aligned, each of the magnetic heads comprising: a core assembly having first and second core halves facing each other and forming a head gap therebetween, the first core half having a recess at one side, where the first core half faces the second core half, so as to form a substantially U-shaped core half having front and rear ribs and a web interposed between the front and rear ribs, the first and second core halves forming a closed magnetic path within a plane including the first and second core halves; and a film coil having a film base and a coil pattern printed on the film base, the film coil having a through-hole at its center, and being incorporated with the core assembly so that a portion of the closed magnetic path passes through the through-hole of the film coil, the film coil being arranged such that a plane of a portion thereof makes an angle other than 90 degrees with respect to the plane including the core halves.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
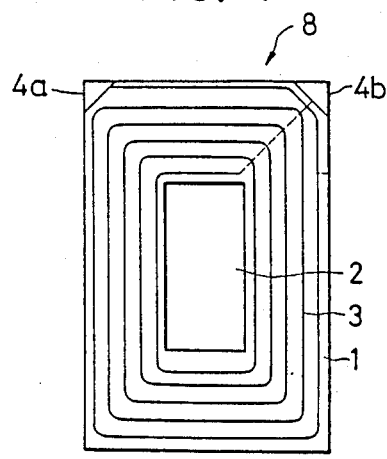
FIG. 1 is a top plan view of a printed coil which will be incorporated with a core assembly to form a magnetic head according to the present invention.

Referring now to FIG. 1, a top plan view of a printed coil is shown. The printed coil, which is generally designated at the reference 8, comprises an insulating thin film base 1 which is nonmagnetic, and a conductive coil pattern 3 deposited on the film base 1. The thin film base 1 functioning as a substrate is made of a synthetic resin, such as polyimide, polyester or the like, and has a thickness of ten to several tens of micrometers. The film base 1 has an opening or through-hole 2 at its center, and the through-hole 2 is generally rectangular so that a portion of a core having a rectangular cross-section will be inserted therein as will be described later. However, the shape of the through-hole 2 can be changed in accordance with the shape of a core used. This through-hole 2 is made by way of punching or etching.

The coil pattern 3 is formed by one of well known thin film printed circuit forming techniques, such as vapor deposition, sputtering, etching, plating or the like. The coil pattern 3 is formed to have a generally rectangular spiral form so that the coil pattern 3 is formed on most area on the surface of the rectangular film base 1. The coil assembly 8 also has a pair of terminals 4a and 4b at edge or corner portions, and the two ends of the coil pattern 3 are respectively connected to these terminals 4a and 4b. The coil pattern 3 as well as the terminals 4a and 4b is covered by an unshown insulating layer. The coil assembly 8 formed in this way will be used in various ways as will be described in connection with various embodiments of the magnetic head.

Figure 2A:
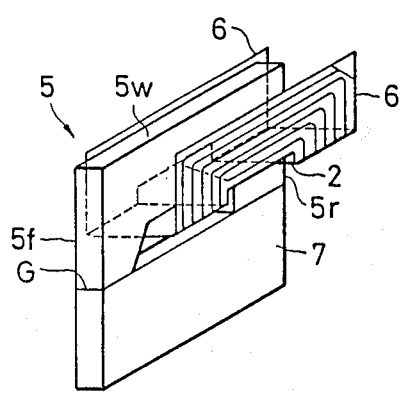
FIG. 2A is a perspective view of an embodiment of the magnetic head according to the present invention.

FIG. 2A shows an embodiment of the magnetic head according to the present invention. The magnetic head comprises a core assembly having first and second core halves 5 and 7 which are made of a magnetic material, such as ferrite, Sendust, permalloy or the like. Each of the core halves 5 and 7 may be made of a block or bulk of such a material, or a lamination of thin films each formed by a thin film forming technique. The first core half 5 has a substantially U-shaped recess at its one side edge so that the first core half 5 is generally U-shaped. These first and second core halves 5 and 7 are assembled so that they face each other to constitute a circulating or closed magnetic path. In detail, the core halves 5 and 7 are attached to each other at front and rear portions in such a manner that the core halves 5 and 7 are directly attached to each other at the rear portion, while they are attached to each other via a nonmagnetic gap spacer (not shown) at the front portion. This front portion or junction between the core halves 5 and 7 will function as a head gap G as will be described later. The U-shaped first core half 5 comprises front and rear ribs 5f and 5r, and a web 5w interposed between these two ribs 5f and 5r.

Prior to incorporating the film coil assembly 8 of FIG. 1 with the core assembly 5 and 7 of FIG. 2A, the film coil assembly 8 is shaped so that it has a U-shaped cross-section when viewed from the front of the head. Here, the word "front" is used to mean the side where the head gap G is provided. Since the film base 1 is made of a synthetic resin film having a thickness of less than several tens of micrometers, the coil assembly 8 of FIG. 1 can be readily bent or curved as shown in FIG. 2A. The U-shaped coil assembly is designated by the reference 6 in order to distinguish it from the flat one shown in FIG. 1.

As seen in FIG. 2A, the U-shaped coil assembly 6 is incorporated with the core assembly 5 and 7 so that a portion of the magnetic path of the core assembly 5 and 7 passes through the through-hole 2 of the coil assembly 6. In detail, the coil assembly 6 is assembled with the first core half 5 before the first core half 5 is attached to the second core half 7. Further in detail, the coil assembly 6 is positioned such that the rear rib 5r of the first core half 5 penetrates the through-hole 2 so that the rear rib 5b is positioned at the center of the spiral coil pattern 3. As best seen in a front view of FIG. 2B, when the coil assembly 6 has been incorporated with the core assembly 5 and 7, right and left halves 6R and 6L of the coil assembly 6 are respectively substantially parallel to the longitudinal plane of the core assembly 5 and 7 except for a middle portion 6M of the coil assembly 6. In other words, the right and left halves 6R and 6L are normal to the gap G while the middle portion 6M is parallel to the gap G.

With this arrangement therefore, the substantial width or length of the head measured in a direction parallel to the longitudinal axis of the gap G is reduced because the coil assembly is bent so that only the middle portion 6M extends in this direction.

Figure 3:
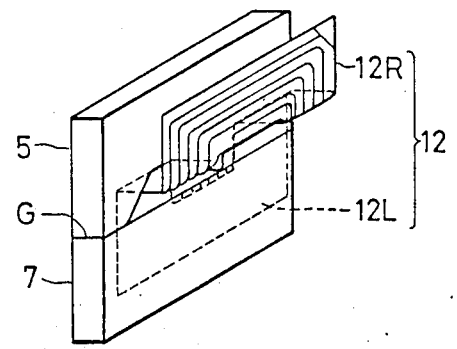
FIG. 3 is a perspective view of another embodiment of the magnetic head according to the present invention.

Reference is now made to FIG. 3 which shows another embodiment. This embodiment magnetic head of FIG. 3 differs from that of FIGS. 2A and 2B in that the coil assembly, which is designated at the reference 12, is bent so that it takes a crank shape. As a result of this arrangement the right half 12R extends upwardly along the right side surface of the first core half 5, while the left half 12L extends downwardly along the left side surface of the second core half 7. Both, the right and left halves 12R and 12L of the coil assembly 12 are substantially parallel to the longitudinal plane of the core assembly 5 and 7 in the same manner as in the embodiment of FIGS. 2A and 2B. Therefore, the width of the head of FIG. 3 is also small.

Figure 4A:
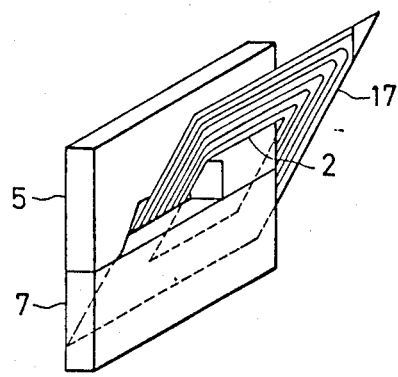
FIG. 4A is a perspective view of another embodiment of the magnetic head according to the present invention.

FIG. 4A shows another embodiment of the present invention. The magnetic head of FIG. 4A comprises a substantially flat coil assembly 17. In other words, the coil assembly 8 of FIG. 1 may be directly used without bending the same. The coil assembly 17 incorporated with the core assembly 5 and 7 is positioned so that it is inclined from a plane normal to the core assembly 5 and 7.

In other words, the plane of the coil assembly 17 makes an angle with respect to the plane including the core assembly 5 and 7, where the angle is greater than 0 degree and smaller than 90 degrees.

Figure 4B:
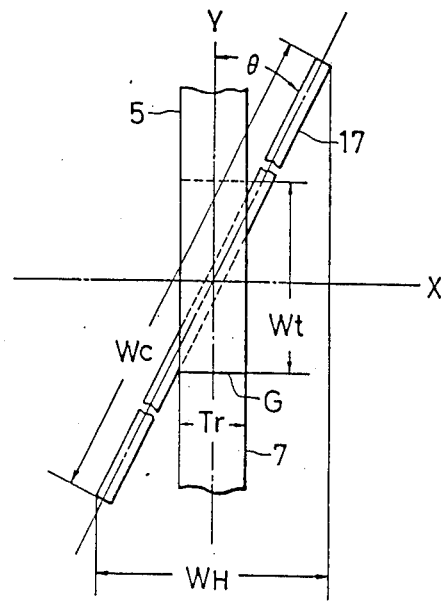
FIG. 4B is a front view of the magnetic head shown in FIG. 4A.

This point will be further described with reference to FIG. 4B showing a front view of the magnetic head of FIG. 4A. The reference X indicates the above-mentioned plane normal to the plane including the first and second core halves 5 and 7, namely, the plane X is parallel to a plane of the head gap G, and another reference Y indicates the above-mentioned plane including first and second core halves 5 and 7. The reference $\theta$ is an angle between the plane of the coil assembly 17 and the second-mentioned plane Y. If the angle $\theta$ is 90 degrees, namely when the coil assembly 17 is substantially normal to the core assembly 5 and 7, the width $W_H$ of the head substantially equals the width $W_C$ of the coil assembly 17, and the width $W_H$ reduces as the angle $\theta$ decreases. However, this angle $\theta$ cannot be reduced beyond 0 degree because the coil assembly 17 is engaged with the core assembly 5 and 7. According to a preferable example, the angle $\theta$ is approximately 30 degrees when the core assembly 5 and 7 has a thickness Tr of 150 micrometers, the width Wt of the through-hole 2 is 500 micrometers, and the thickness Tc of the coil assembly 17 is 60 micrometers. Since the width $W_H$ of the head is given by $W_H = W_C \cdot \sin \theta$, when the angle $\theta$ is 60 degrees, $W_H$ is one half the actual width $W_C$ of the coil assembly 17.

From the above description it will be understood that the present invention provides a new and useful arrangement of a magnetic head whose width or length in a direction normal to the core assembly 5 and 7 is small. Since this direction is parallel to the head gap G, and therefore, parallel to the width direction of a magnetic recording tape which may be used, the size of the head measured in the transverse direction of a magnetic tape can be made small. Therefore, when the magnetic head according to the present invention is applied to a multi-track head, which usually has a narrow and limited space between adjacent heads, it is possible to employ coils each having a large number of turns, while the diameter of the coil wire or conductor can be made large without increasing the space between adjacent heads.

Figure 2B:
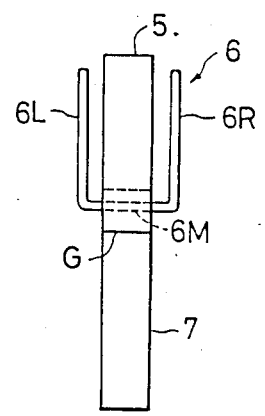
FIG. 2B is a front view of the magnetic head shown in FIG. 2A.
Figure 5:
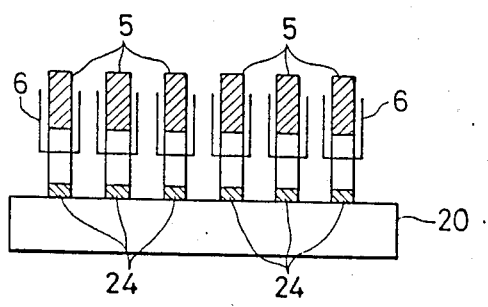
FIG. 5 is a front view of a multi-track magnetic head according to the present invention, partially using the structure of FIG. 2.
Figure 6:
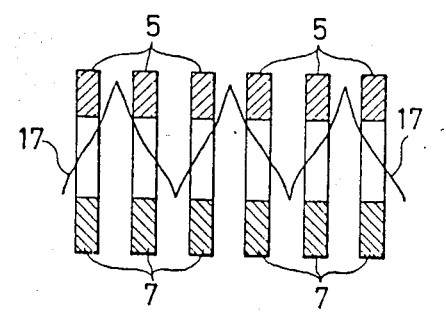
FIG. 6 is a front view of a multi-track magnetic head according to the present invention, using the structure of FIG. 4.

Hence, reference is now made to FIGS. 5 and 6 which respectively show embodiments of multi-track head according to the present invention. The multi-track head of FIG. 5 is fabricated by applying the arrangement of FIGS. 2A and 2B. However, each head in the multi-track head of FIG. 5 differs from that of FIGS. 2A and 2B in that the second core half 7 of FIG. 2 is replaced with a core half 24 made of a thin film coil formed on a substrate 20. Namely, a plurality of thin film coils 24 is formed on the substrate 20 by a printed circuit forming technique in advance, and then a plurality of block or bulk cores 5, which corresponds to the first core half 5 of FIG. 2, are assembled with the thin film coils 24 with the coil assemblies 6 incorporated with the block cores 5.

Another multi-track head of FIG. 6 is fabricated by applying the arrangement of FIGS. 4A and 4B. In this multi-track head, block or bulk cores are used as the second core halves 7 in the same manner as in FIG. 2. These two types of structures for the second core half 7 may be used interchangeably for both the embodiments of FIGS. 5 and 6.

The track pitch of a multi-track head is determined by the number of tracks to be made and the entire width of a recording medium, and in a multi-track head of narrow track type, the track pitch is very small, such as 100 to 200 micrometers. In a conventional multi-track head having such a narrow track pitch, there are only several turns of the coil at the most due to the limited space between adjacent heads. Furthermore, the thickness of the coil wire is 1 to 2 micrometers at the most in such a multi-track head. Because of these limitations, therefore, the number of coil turns and the electric current capacity are insufficient so that recording/reproducing efficiency is unsatisfactory. The present invention solves this problem inherent to the conventional multi-track head. Namely, the number of coil turns can be increased from several to several tens of times that of conventional head, while the thickness of the coil conductor can be remarkably increased. As a result, a large amount of current can be applied in the case of a record head so as to develop a sufficient intensity of magnetic field, and in the case of a reproduce head, a large amount of reproduced output signal can be derived. The increase in the thickness of the coil conductor also contributes to provide a low impedance so that a high output voltage can be developed and derived in the case of a reproduce head.

In a multi-track head it is important to prevent crosstalk between adjacent tracks or heads. In order to reduce undesirable crosstalk magnetic shielding members or plates are preferably provided.

Figure 7:
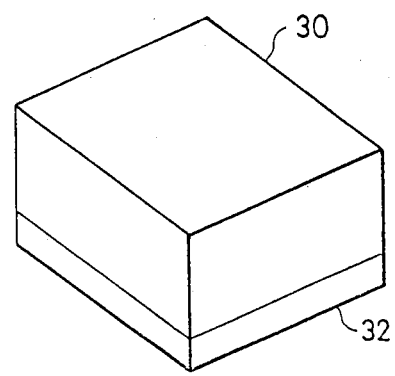
FIGS. 7 through 12 show the way of manufacturing further embodiments of the multi-track magnetic head according to the present invention.

Hence, reference is now made to FIGS. 7 through 12 which show the ways of fabricating other embodiments of multi-track head according to the present invention. FIG. 7 shows a block 30 of a magnetic material which will be used as a plurality of first core halves 5 in a multi-track head. The block 30 is attached to a substrate 32 made of a nonmagnetic material, such as glass or the like. This substrate 32 is provided for easy handling and machining.

Figure 8:
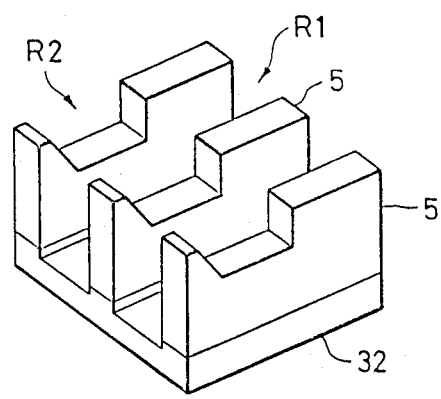
Figure 9:
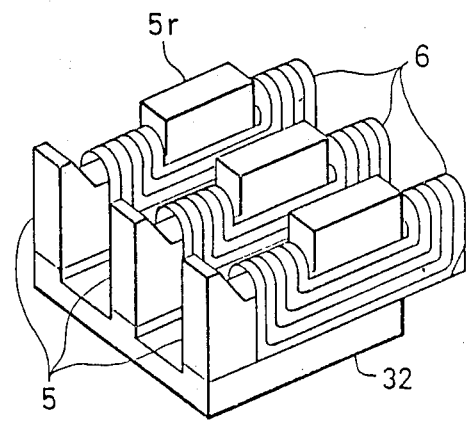

The combination of the block 30 and the substrate 32 is machined or cut to form a plurality of first and second recesses R1 and R2 as shown in FIG. 8. Namely, the first recesses R1 are made to the depth that the substrate 32 is also cut to form parallel grooves defining a plurality of first core halves 5 therebetween. The second recesses R2 are made so that each of the first core halves 5 is generally U-shaped. Then a plurality of coil assemblies 6, which have been bent to take a U-shape, are assembled as shown in FIG. 9 so that a projecting rear end 5r of each first core is inserted in the through-hole 2 of each coil assembly 6.

Figure 10:
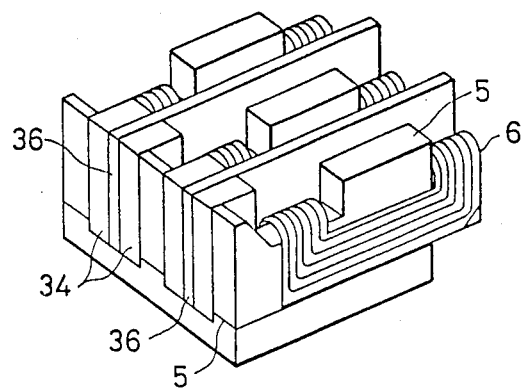

Then spacers 34 and shielding plates 36 are inserted so that they are placed between two consecutive first core halves 5 as shown in FIG. 10. Although the spacers 34 are located at the front end of the multi-track head, each shielding plate 36 extends from the front portion to the rear portion of each first core half 5 so as to effectively shield the magnetic field from one head to another. FIG. 10 shows a completed half of the multi-track head, and this half is referred to as a first core half assembly as it includes a plurality of first core halves 5 and coil assemblies 6. The first core half assembly of FIG. 10 will be assembled with another half, i.e. second core half assembly, including a plurality of second core halves 7. The upper surface of the first core assembly, which surface will face the second core half assembly, is mirror-finished after a synthetic resin is filled to secure the coil assemblies 6.

Figure 11:
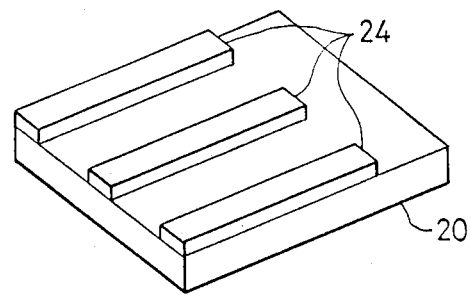
Figure 12:
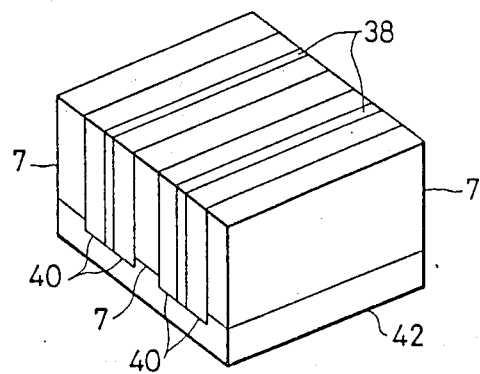

FIG. 11 and FIG. 12 show respectively two examples of the above-mentioned second core half assembly including a plurality of second core halves 24 or 7. The second core half assembly of FIG. 11 is provided by forming a plurality of thin film cores 24 on a nonmagnetic substrate 20. The thin film cores 20 may be formed by way of vapor deposition or the like. Unshown nonmagnetic layer is deposited on the thin film cores 24 at a place close to the front end. This nonmagnetic layer will be interposed between the first and second core halves to provide a plurality of head gaps. The second core half assembly of FIG. 11 will be assembled with the first core half assembly of FIG. 10 so that the thin film cores 24 respectively face the first core halves 5. As a result, a multi-track magnetic head similar to that of FIG. 5 but having shielding plates 36 is completed.

Turning to FIG. 12, this second core half assembly comprises a plurality of block or bulk second cores 7 arranged in parallel. A plurality of shielding plates 38 are provided so that each is interposed between adjacent second cores 7 with a pair of spacers 40 positioned at both sides of the spacer 40. The second core assembly of FIG. 12 may be formed in the manner as shown in FIGS. 7 and 8 by attaching a block magnetic material to a nonmagnetic substrate 42, and by machining the assembled body to form a plurality of parallel grooves in which the above-mentioned spacers 40 and shielding plates 38 are fit. The second core assembly is fixed by means of a synthetic resin and is also mirror-finished so that the surface, which will face the above-mentioned mirror-finished surface of the first core half assembly, is smooth.

When the first core assembly of FIG. 10 is assembled with one of the second core assemblies of FIGS. 11 and 12, the entire multi-track head is fixed by means of a filling synthetic resin to form a resin-molded head. Then the front end of the multi-track head is polished to obtain a mirror-finished surface so that the front end which will be in contact with a magnetic recording medium is smooth.

In the examples of FIGS. 5 through 12 it is shown that the multi-track head comprises only several heads for simplicity, but it will be understood that the number of heads can be increased so that a multi-track head for use with 10 to 20 or more tracks can be provided.

In the above-described embodiment, although the coil assembly has a coil pattern formed in a single layer, the number of coil pattern layers may be increased by laminating a plurality of coil patterns so that the number of coil turns can be increased without increasing the diameter of the coil assembly. Such an increase in the number of coil turns will provide a higher output signal voltage when the head is used as a reproduce head.

The above-described embodiments are just examples of the present invention, and therefore, it will be apparent for those skilled in the art that many modifications and variations may be made without departing from the spirit of the present invention.

What is claimed is:

1. A multi-track head having a plurality of aligned magnetic heads, adjacent magnetic head pairs forming spaces therebetween, each of said magnetic heads comprising:
   (a) a core assembly having first and second core halves facing each other and forming a head gap therebetween, said first core half having a recess at a side where said first core half faces said second core half for forming a substantially U-shaped core half having front and rear ribs and a web interposed between said front and rear ribs, said front rib together with said second half forming said head gap on a front side surface of each of said magnetic heads, said first and second core halves forming a closed magnetic path along a plane including surfaces of said first and second ore halves, and
   (b) a film coil assembly including a flexible, sheet-like film base having a through-hole at its center, said film base having spirally printed thereon a coil around said through-hole, said film coil assembly being set into said core assembly by having said rear rib of said first core half passing through said through-hole whereby only said rear rib is circumferentially surrounded by said coil assembly, portions of said film coil assembly protruding away from surfaces of said rear rib perpendicular to said front side surface, each of said portions being bent to form a planar configuration having an angle acute to one of said surfaces of said rear rib;
   wherein, for said multi-track head, except for respective outer bent portions of two outermost core assemblies of said plurality of aligned magnetic heads, the bent portions of the film coil assemblies of said plurality of magnetic heads are positioned within the spaces formed by said adjacent magnetic head pairs.

2. A multi-track head having a plurality of aligned magnetic heads, adjacent magnetic head pairs forming spaces therebetween, each of said magnetic heads comprising:
   (a) a core assembly having first and second core halves facing each other for forming a head gap therebetween, said first core half having a recess at a side where said first core half faces said second core half for forming a substantially U-shaped core half having front and rear ribs, said first and second core halves forming a closed magnetic path along a plane parallel to side surfaces of said first and second core halves, and
   (b) a film coil assembly including a flexible, sheet-like film base having a through-hole at its center, said film base having spirally printed thereon a coil around said through-hole, said film coil assembly being incorporated into said core assembly by having said rear rib of said first core half passing through said through-hole, spirally printed, planar coil portions on said film coil assembly protruding away from the side surfaces of said core assembly, each of said portions extending at an acute angle to said side surfaces of said core assembly;
   wherein, for said multi-track head, except for respective outer protruding coil portions of two outermost core assemblies of said plurality of magnetic heads, the protruding portions of the coil assemblies of said plurality of magnetic heads are positioned within the spaces formed by said adjacent magnetic head pairs and extend as a continuous structure between all of the core assemblies.

3. A multi-track head having a plurality of aligned magnetic heads, adjacent magnetic head pairs forming spaces therbetween, each of said magnetic heads comprising:
   (a) a core assembly having first and second core halves facing each other and forming a head gap therebetween, said first core half having a recess at a side where said first core half faces said second core half for forming a substantially U-shaped core half having front and rear ribs and a web interposed between said front and rear ribs, said front rib together with said second half forming said head gap on a front side surface of each of said magnetic heads, saids first and second ore halves forming a closed magnetic path along a plane including surfaces of said first and second core halves, and (b) a film coil assembly including a flexible, sheet-like film base having a through-hole at its center, said film base having spirally printed thereon a coil around said through-hole, said film coil assembly being set into said core assembly by having said rear rib of said first core half core half passing through said through-hole whereby only said rear rib is circumferentially surrounded by said coil assembly, portions of said film coil assembly protruding away from surfaces of said rear rib perpendicular to said front side surface, each of said portions being bent to form a planar configuration positioned parallel to said surfaces of said rear rib;
wherein, for said multi-track head, except for respective outer bent portions of two outermost core assemblies of said plurality of aligned magnetic heads, the bent portions of the film coil assemblies of said plurality of magnetic heads are positioned within the spaces formed by said adjacent magnetic head pairs.

4. A multi-track head as claimed in claim 3, wherein said film coil assembly has a crank-shaped cross-section when viewed from a front end of said magnetic head.

5. A multi-track head as claimed in claims 1 or 2, wherein said film coil assembly is substantially flat, and intersects said plane of said core halves at an angle less than 90 degrees when viewed from a front end of said magnetic head.

6. A multi-track head as claimed in claim 1, 2 or 3, wherein said first core is made of a block of a magnetic material.

7. A multi-track head as claimed in claim 1, 2 or 3, wherein said first core is made of a lamination of magnetic material films.

8. A multi-track head as claimed in claim 1, 2 or 3, wherein said second core is made of a block of magnetic material.

9. A multi-track head as claimed in claim 1, 2 or 3, wherein said second core is made of a thin film core deposited on an insulating substrate.

10. A multi-track head as claimed in claim 1, 2, 3, wherein said base of said film coil is made of polyimide.

11. A multi-track head as claimed in claim 1, 2, or 3, wherein said film coil is made of polyester.

12. A multi-track head as claimed in claim 1, 2, or 3, wherein said film coil is rectangular.

13. A multi-track head as claimed in claim 1, 2 or 3, wherein said through-hole of said film coil is rectangular.

14. A multi-track head as claimed in claim 1 or 2, wherein said film coil is inclined from said plane including surfaces of said first and second core halves by 30 degrees or less.

15. A multi-tack head as claimed in claim 3, wherein said film coil assembly has a U-shaped cross-section when viewed from a front end of said magnetic head.

16. A multi-track head as claimed in claim 1, 2 or 3, further comprising a plurality of shielding plates each interposed between two consecutive heads.

17. A multi-track head as claimed in claim 1 or 2, wherein siad film coils of adjacent heads are positioned relative to planes between the respective heads and connected together to form a zig-zag pattern.

* * * * *